United States Patent
Pande et al.

(10) Patent No.: US 11,867,180 B2
(45) Date of Patent: Jan. 9, 2024

(54) SEAL ASSEMBLY FOR HIGH PRESSURE SINGLE SCREW COMPRESSOR

(71) Applicant: Copeland Industrial LP, Cudahy, WI (US)

(72) Inventors: Abhijit Pande, Pune (IN); Pallavi Narkhede, Pune (IN); Steven Fels, West Allis, WI (US); Jean-Louis Picouet, Waukesha, WI (US)

(73) Assignee: Copeland Industrial LP, Cudahy, WI (US)

( * ) Notice: Subject to any disclaimer, the term of this patent is extended or adjusted under 35 U.S.C. 154(b) by 40 days.

(21) Appl. No.: 16/665,439

(22) Filed: Oct. 28, 2019

(65) Prior Publication Data

US 2020/0300244 A1    Sep. 24, 2020

Related U.S. Application Data

(60) Provisional application No. 62/822,245, filed on Mar. 22, 2019.

(51) Int. Cl.
*F04C 27/00* (2006.01)
*F16J 15/453* (2006.01)
*F04C 18/52* (2006.01)
*F25B 1/047* (2006.01)

(52) U.S. Cl.
CPC ............ *F04C 27/004* (2013.01); *F04C 18/52* (2013.01); *F16J 15/453* (2013.01); *F05C 2225/08* (2013.01); *F25B 1/047* (2013.01)

(58) Field of Classification Search
CPC ....... F04C 27/004; F04C 18/52; F16J 15/453; F25B 1/047; F05C 2225/08
See application file for complete search history.

(56) References Cited

U.S. PATENT DOCUMENTS

| 3,275,226 | A | * | 9/1966 | Whitfield | F04C 29/0035 |
| | | | | | 418/203 |
| 4,704,069 | A | | 11/1987 | Kocher et al. | |
| 6,050,797 | A | * | 4/2000 | Zhong | F04C 29/0021 |
| | | | | | 418/203 |
| 6,186,758 | B1 | * | 2/2001 | Shaw | F04C 29/0021 |
| | | | | | 384/303 |

(Continued)

FOREIGN PATENT DOCUMENTS

| JP | 2017036816 | 2/2017 |
| KR | 1279567 | 6/2013 |

(Continued)

OTHER PUBLICATIONS

TenCate Cetex Product Datasheet, TenCate Cetex TC1100 PPS Resin System, 1 page (known at least as early as Aug. 8, 2014).
Ryton R-4, Polyphenylene Sulfide Resins, pp. 1-2 (Jan. 2014).
PCT/US2019/064632 International Search Report and Written Opinion of the International Searching Authority dated Feb. 5, 2020 (11 pages).
PCT/US2019/064632 International Preliminary Report on Patentability and Written Opinion of the International Searching Authority dated Sep. 28, 2021 (7 pages).

(Continued)

*Primary Examiner* — Bryan M Lettman
(74) *Attorney, Agent, or Firm* — Amundsen Davis, LLC

(57) ABSTRACT

A seal assembly configured for use with a high pressure single screw compressor includes a seal body and at least one attachment structure. The at least one attachment structure fixedly attaches the seal body to the rotor of the compressor, such that the seal body is rotatable along with the rotor. The seal body has a textured outer surface which creates a labyrinthine path between the compressor housing and the seal body.

20 Claims, 3 Drawing Sheets

(56) References Cited

U.S. PATENT DOCUMENTS

| | | |
|---|---|---|
| 6,287,100 B1 | 9/2001 | Achtelik et al. |
| 6,612,820 B1 | 9/2003 | Staat et al. |
| 7,025,356 B1 | 4/2006 | Cheung et al. |
| 9,568,001 B2 | 2/2017 | Endo et al. |
| 9,803,639 B2 | 10/2017 | Hauser et al. |
| 2008/0084030 A1* | 4/2008 | Wilson .................. F16J 15/442 277/409 |
| 2011/0135454 A1* | 6/2011 | Grondahl ............. F16J 15/3292 277/411 |
| 2014/0356196 A1* | 12/2014 | Moore ................. F04B 49/103 417/266 |
| 2018/0017058 A1* | 1/2018 | Shikano ................. F04C 28/12 |
| 2019/0010744 A1 | 1/2019 | Jowekar et al. |
| 2019/0010944 A1* | 1/2019 | Jorwekar ............... F16J 15/453 |
| 2021/0341059 A1* | 11/2021 | Hocker ................... F16J 15/32 |

FOREIGN PATENT DOCUMENTS

| | | | | |
|---|---|---|---|---|
| WO | WO2016083591 | * | 6/2016 | ........... F16J 15/3284 |
| WO | 2018042197 | | 3/2018 | |
| WO | 2018052463 | | 3/2018 | |

OTHER PUBLICATIONS

First Examination Report from the Intellectual Property Office of India for Application No. 202147042710 dated Apr. 21, 2022 (6 pages).

Chinese Office Action dated Feb. 25, 2023 for Chinese Application No. 201980095293.7 filed on Dec. 5, 2019 (13 pages with English Summary).

* cited by examiner

SEAL ASSEMBLY FOR HIGH PRESSURE SINGLE SCREW COMPRESSOR

FIELD OF THE INVENTION

The present invention relates generally to single screw compressors. In one aspect, the present invention relates to a seal between the discharge (high pressure) of high pressure single screw compressors and the suction (low pressure) of such compressors.

BACKGROUND OF THE INVENTION

Single screw compressors are used, for example, in compression systems, such as refrigeration systems, to compress a gas, such as refrigerant gas, for example "Freon," ammonia, natural gas, or the like. A compressor generally uses a drive source to output compressed gas. Screw compressors, specifically, employ a housing in which a motor-driven main rotor having helical grooves thereon meshes with rotors on opposite sides of the main rotor to define gas compression chambers. It will be appreciated that a pressure differential is thereby created between a suction end cavity (lower pressure) and a discharge end cavity (higher pressure).

Standard single screw compressors operate at discharge pressures up to 350 psi, while high pressure single screw compressors operate at discharge pressures greater than 350 psi and up to 1500 psi. It will be appreciated that the design of various components may differ between a standard single screw compressor and those operating at high pressures. For example, high pressure single screw compressors experience a greater pressure differential between the suction end cavity and the discharge end cavity. The seal between the discharge cavity of a high pressure screw compressor and the suction cavity of a high pressure screw compressor must therefore accommodate the greater pressure differential than the seal for a standard single screw compressor.

Existing seals between the discharge and suction cavities can be machined directly to the rotor, as shown in PRIOR ART FIG. 1. In this case, the seal itself rotates with the main rotor. Alternatively, existing seals are provided as a separate part secured to the inside of the compressor housing, as shown in PRIOR ART FIG. 2. In these cases, the efficiency of the seal depends on the clearance which can be obtained between either the seal and the housing wall or rotor and the seal. The greater the distance, the less efficient the seal. The efficiency of the seal is also dependent on the amount of wear on the seal over time.

With respect to the seal shown in PRIOR ART FIG. 1, the clearance between the housing and the seal on the rotor cannot be significantly optimized because both the housing and the rotor are metal. That is, metal does not wear as readily as other materials and damage to the housing and/or rotor may occur if the clearance between the housing and the rotor is not sufficient. In contrast, when the seal is provided on the housing wall, it will be appreciated that two different seal surfaces are needed and optimizing the clearance can be difficult.

Accordingly, a need exists for a seal assembly for high pressure single screw compressors which addresses one or more of the above deficiencies or other problems.

SUMMARY OF THE INVENTION

In one aspect, a seal assembly is disclosed. The seal assembly is configured for use with a high pressure single screw compressor. The assembly comprises a seal body having a textured outer surface; and at least one attachment structure which fixedly attaches the seal body to, so as to be rotatable along with, a main rotor of the high pressure single screw compressor. The textured outer surface creates a labyrinthine path between a compressor housing and the seal body.

In another aspect, a high pressure single screw compressor is disclosed. The high pressure single screw compressor comprises a housing, a main rotor that is secured within the housing and rotatably driven by a main rotor drive shaft about a main rotor drive shaft axis, and operably engaged with a plurality of gate rotors that are also secured within the housing; and a seal assembly. The seal assembly comprises a seal body having a textured outer surface, and at least one attachment structure which fixedly attaches the seal body to, so as to be rotatable along with, the main rotor of the high pressure single screw compressor. The textured outer surface creates a labyrinthine path between the housing and the seal body.

Other embodiments, aspects, features, objectives and advantages of the seal assembly in accordance with embodiments of the present disclosure will be understood and appreciated upon a full reading of the detailed description and the claims that follow.

DESCRIPTION OF THE DRAWINGS

Features of the present disclosure, which are believed to be novel, are set forth with particularity in the appended claims. Embodiments of the disclosure are described with reference to the accompanying drawings and are for illustrative purposes only. The disclosure is not limited in its application to the details of construction or the arrangement of the components illustrated in the drawings. The seal assembly of the present disclosure is capable of other embodiments or of being practiced or carried out in other various ways. Like reference numerals are used to indicate like components. In the drawings:

DETAILED DESCRIPTION OF PREFERRED EMBODIMENTS

Figure 3:
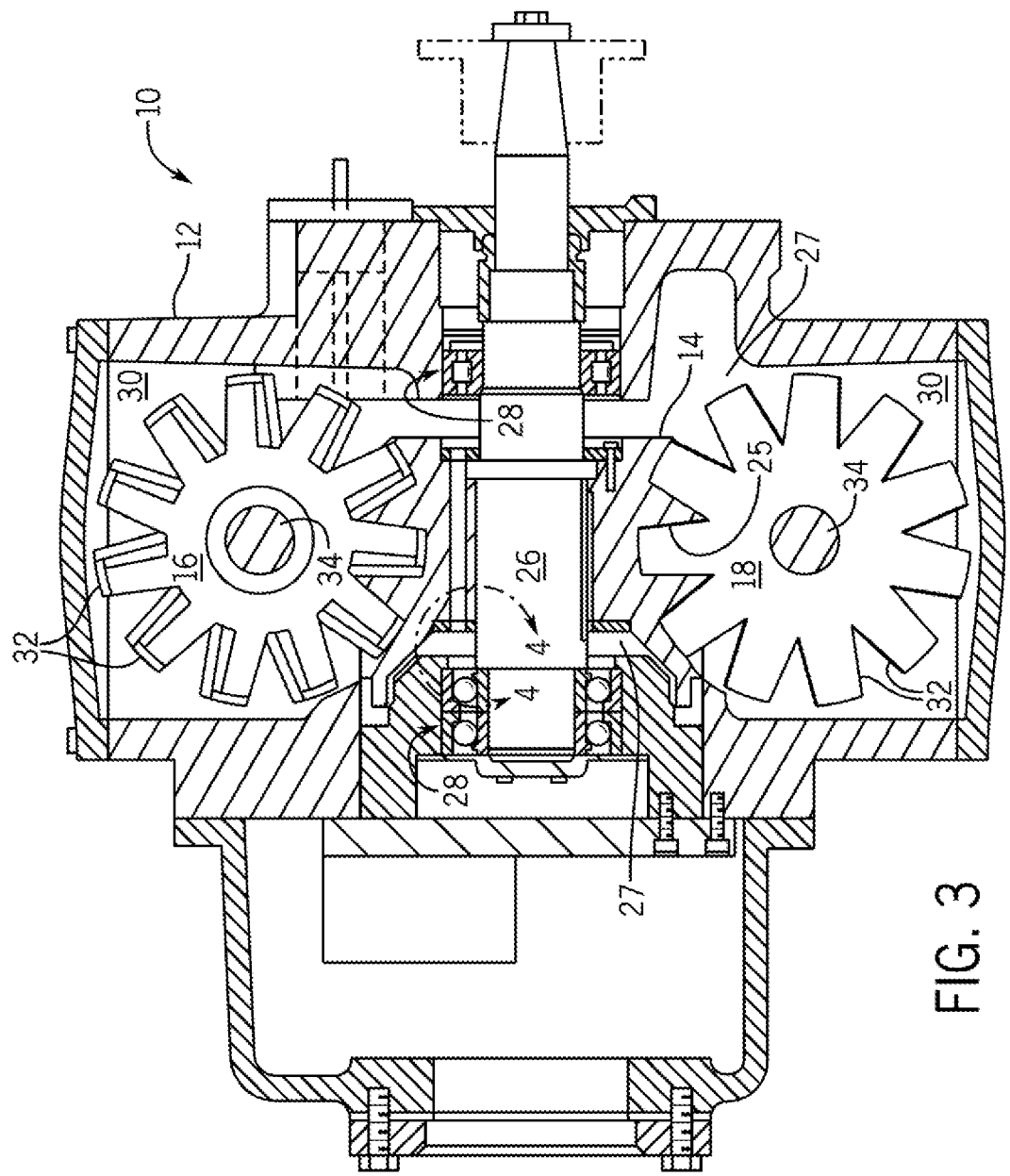
FIG. 3 is a top view, partly in cross-section and with portions broken away, of an exemplary high pressure single screw compressor employing a single screw rotor and a pair of star or gate rotors in accordance with embodiments of the present disclosure.

Referring to FIG. 3, numeral 10 designates an exemplary embodiment of a single screw compressor adapted for use in a compression system, such as a refrigeration system (not shown), or the like, and which may include a seal assembly 100 (not shown) in accordance with embodiments of the present disclosure. The single screw compressor 10 generally comprises a compressor housing 12, a single main rotor 14 mounted for rotation in the housing 12, and a pair of star-shaped gate or star rotors 16, 18 mounted for rotation in the housing 12 and engaged with the main rotor 14.

The compressor housing 12 includes a cylindrical bore (not shown) in which the main rotor 14 is rotatably mounted.

The bore is open at its suction end 27 and is closed by a discharge end wall (not shown). The main rotor 14, which is generally cylindrical and has a plurality of helical grooves 25 formed therein defining compression chambers, is provided with a rotor shaft 26 which is rotatably supported at opposite ends on bearing assemblies 28 mounted on the housing 12. The rotor shaft 26 drives rotation of the main rotor 14 about a main rotor shaft axis.

The compressor housing 12 includes spaces 30 therein in which the star or gate rotors 16, 18 are rotatably mounted and the rotors 16, 18 are located on opposite sides (i.e., 180 degrees apart) of the main rotor 14. Each of the rotors 16, 18 has a plurality of gear teeth 32 and is provided with a rotor shaft 34 which is rotatably supported at opposite ends on bearing assemblies mounted on the housing. Each of the rotors 16, 18 successively engages a groove 25 in the main rotor 14 as the latter is rotatably driven by a motor (not shown) and, in cooperation with the wall of the bore (not shown) and specifically its end wall (not shown), defines a gas compression chamber.

Figure 4:
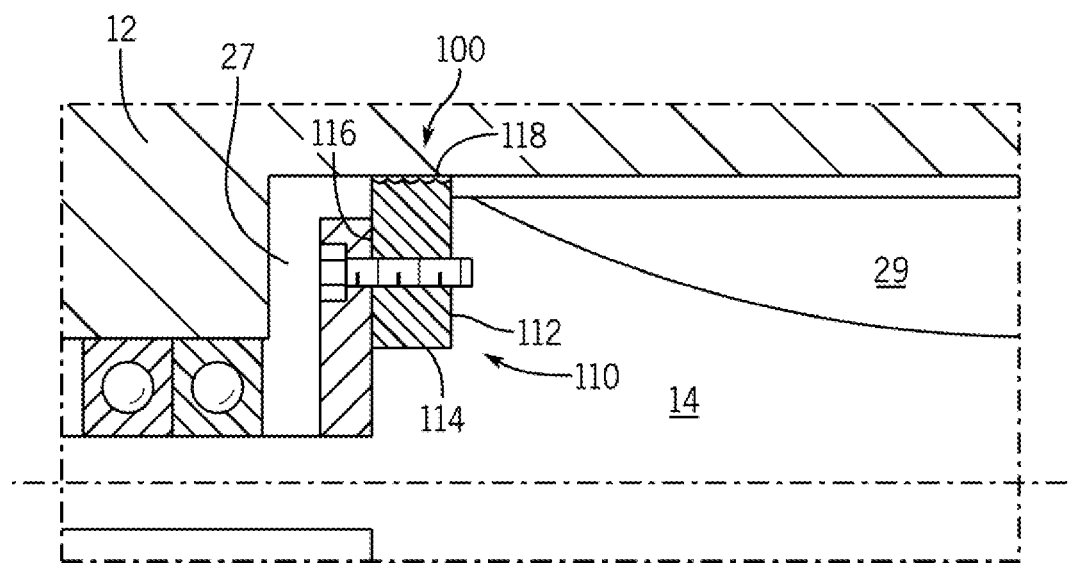
FIG. 4 is a schematic illustration of a portion of the high pressure single screw compressor of FIG. 3 which shows the seal assembly in further detail in accordance with embodiments of the present disclosure.

FIG. 4 is a schematic illustration of a portion of the single screw compressor of FIG. 3. Specifically, FIG. 4 shows a portion of the suction end cavity 27 with the main rotor 14 and housing 12 forming a discharge cavity 29. A seal assembly 100 is provided between the suction end cavity 27 and the discharge cavity 29. As will be appreciated in view of the description above in relation to FIG. 3, the suction end cavity 27 is generally a low-pressure cavity, with pressure in the suction end cavity 27 being around 30 psi in standard operating conditions. Compression of gases results in a high pressure in the discharge cavity 29. In standard single screw compressors, the pressure in the discharge cavity 29 is around 150-300 psi. However, in the high-pressure single screw compressors of the present disclosure, pressures in the discharge cavity 29 range from 350 psi to 2000 psi. In the embodiment shown, the pressure in the discharge cavity 29 is from 350 psi, or 400 psi, or 500 psi, or 750 psi to 800 psi, or 1000 psi, or 1200 psi, or 1500 psi, or 2000 psi.

In an embodiment, the difference in pressure between the suction end cavity 27 and the discharge cavity 29 is greater than or equal to 150 psi, or greater than or equal to 200 psi, or greater than or equal to 250 psi, or greater than or equal to 300 psi, or greater than or equal to 350 psi, or greater than or equal to 400 psi, or greater than or equal to 450 psi, or greater than or equal to 500 psi, or greater than or equal to 550 psi, or greater than or equal to 600 psi.

In an embodiment, the difference in pressure between the suction end cavity 27 and the discharge cavity 29 is up to 600 psi, or 700 psi, or 800 psi, or 900 psi, or 1000 psi, or 1250 psi, or 1500 psi, or 1750 psi, or 2000 psi.

Figure 1:
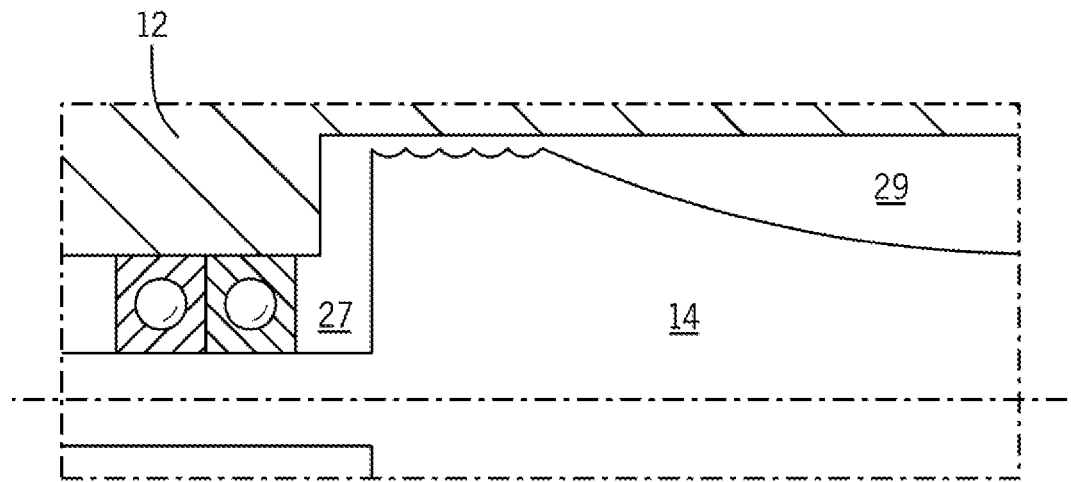
FIG. 1 illustrates a prior art example of a seal for a high pressure single screw compressor.
Figure 2:
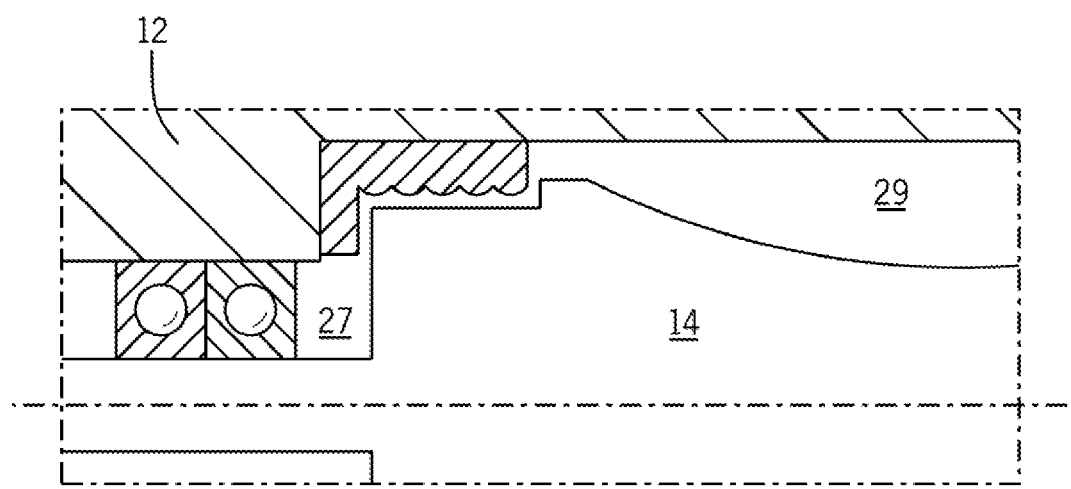
FIG. 2 illustrates a further prior art example of a seal for a high pressure single screw compressor.

In contrast to the prior art seal shown in PRIOR ART FIG. 1, the seal assembly 100 is not machined directly to the main rotor 14. Further, in contrast to the prior art seal shown in and PRIOR ART FIG. 2, the seal assembly 100 is not an independent component fixedly attached to the interior of the housing 12. Rather, the seal assembly 100 in accordance with embodiments of the present disclosure is an independent component fixedly attached to the main rotor 14.

As shown in FIG. 4, the seal assembly 100 is composed of a seal body 110 fixedly attached to the main rotor 14 using one or more attachment structures 130. Specifically, in the embodiment shown, the seal body 110 is disposed around at least a portion of the circumference of the main rotor 14, and preferably around substantially the entirety of the main rotor 14. That is, in an embodiment, the seal body 110 is arcuate, and preferably disc-shaped to substantially or completely surround a circumference of the main rotor 14.

Further, in the embodiment shown in FIG. 4, a cross-section of the seal body 110 is generally rectangular. In an embodiment, the seal body 110 has a consistent cross-sectional geometry along the length of the seal body 110.

When viewed in cross-section as in FIG. 4, the side surfaces 112, 116 and inner surface 114 which abuts the main rotor 14 are generally smooth, while the outer surface 118 which faces the interior of the main housing 12 is textured to create a labyrinthine path from the suction end cavity 27 to the discharge cavity 29 between the seal body 110 and the housing 12. In the embodiment shown, the labyrinthine path on the outer surface 118 of the seal body 110 is formed by a plurality of grooves of approximately the same depth along the arcuate outer surface 118 of the seal body 110. The grooves are evenly spaced along the outer surface 118. It will be appreciated that in further embodiments, the labyrinthine path may be formed using any surface texture which accomplishes the creation of the labyrinthine path, including, for example, and not limited to, grooves, teeth, channels, serpentine channels, bumps, stippling, and combinations thereof, any or all of which may be consistently, symmetrically or evenly spaced or positioned along the outer surface 118, and any or all of which may have the same or different height or depth from or into the seal body 110.

As mentioned above, in the embodiment shown, the seal body 110 entirely surrounds the main rotor 14 at a circumferences of the main rotor 14. In other words, in the embodiment shown in FIG. 4, the seal body 110 is generally ring-shaped or disc-shaped having an outer diameter and an inner diameter. The thickness of the seal body 110 is consistent across all of the seal body 110.

Importantly, the seal body 110 is not made of metal. Rather, the seal body 110 is made of a resin material, and more preferably a thermoplastic material or thermoset material. As used herein, the term "thermoplastic material" refers to a polymer or resin which once set in solid form, can again become pliable or moldable upon application of heat. As used herein, the term "thermoset material" refers to a polymer or resin which, once set in a solid form, does not again become pliable or moldable upon the application of heat. In other words, thermoplastic materials can be re-melted and re-formed several time, while thermoset materials once formed cannot be again melted and re-formed—they are permanently in the set form. In a particular embodiment, the thermoplastic material or thermoset material is a polyphenylene sulfide resin.

Further, in an embodiment, the thermoplastic or thermoset material is carbon or glass reinforced. That is, the thermoplastic or thermoset material contains carbon fibers, including woven carbon fibers, or glass fibers. In a particular embodiment, the thermoplastic or thermoset material comprises from 10%, or 15%, or 20%, or 25%, or 30%, or 40% or 50%, or 60% based on the total weight of the thermoplastic or thermoset material.

In an embodiment, the thermoplastic or thermoset material is a thermoplastic material having from 20%, or 30% to 40%, or 50% woven carbon fibers or glass fibers, based on the total weight of the thermoplastic material. In a further embodiment, the thermoplastic material is a polyphenylene sulfide resin having from 20%, or 30% to 40%, or 50% woven carbon fibers or glass fibers.

In an embodiment, the thermoplastic or thermoset material having carbon or glass fibers has a specific gravity from 1.25 g/cc, or 1.30 g/cc, or 1.35 g/cc, or 1.40 g/cc, or 1.45 g/cc, or 1.50 g/cc to 1.55 g/cc, or 1.60 g/cc, or 1.65 g/cc, or 1.70 g/cc, or 1.75 g/cc, as measured in accordance with ASTM D792. In an embodiment, the thermoplastic of thermoset material having carbon or glass fibers has a specific gravity from 1.45 g/cc, or 1.50 g/cc to 1.55 g/cc, or 1.60 g/cc, or 1.65 g/cc, or 1.70 g/cc.

In an embodiment, the thermoplastic of thermoset material having carbon or glass fibers has a tensile strength from 90 MPa, or 95 MPa, or 100 MPa, or 110 MPa, or 120 MPa to 130 MPa, or 140 MPa, or 150 MPa, or 160 MPa, or 170 MPa, or 175 MPa, as measured in accordance with ISO 527.

In another embodiment, the thermoplastic or thermoset material having carbon or glass fibers has a tensile strength from 15 kpsi, or 18 kspi, or 20 kpsi, or 22 kpsi to 25 kpsi, or 27 kpsi, or 30 kpsi, or 35 kpsi, as measured in accordance with ASTM D638.

In another embodiment, the thermoplastic or thermoset material having carbon or glass fibers has a tensile strength) (90°) from 550 MPa, or 600 MPa, or 625 MPa, or 650 MPa to 675 MPa, or 700 MPa, or 725 MPa, or 750 MPa, or 775 MPa, or 800 MPa, or 850 MPa, or 900 MPa, as measured at 20° C., or 23° C. (50% relative humidity), or 80° C.

In an embodiment, the thermoplastic or thermoset material having carbon or glass fibers has a glass transition temperature from 80° C., or 90°, or 100° C. to 110° C., or 120° C., or 130° C.

In an embodiment, the thermoplastic or thermoset material having carbon or glass fibers has a melting temperature from 250° C., or 260° C., or 270°, or 280° C. to 290°, or 300° C., or 310° C., or 320° C., or 330° C., or 350° C.

In an embodiment, the thermoplastic or thermoset material has one, some or all of the following properties:
i) from 20%, or 30% to 40%, or 50% woven carbon fibers or glass fibers; and/or
ii) a specific gravity from 1.45 g/cc, or 1.50 g/cc to 1.55 g/cc, or 1.60 g/cc, or 1.65 g/cc, or 1.70 g/cc; and/or
iii) a tensile strength from 90 MPa, or 95 MPa, or 100 MPa, or 110 MPa, or 120 MPa to 130 MPa, or 140 MPa, or 150 MPa, or 160 MPa, or 170 MPa, or 175 MPa, as measured in accordance with ISO 527; and/or
iv) a tensile strength from 15 kpsi, or 18 kspi, or 20 kpsi, or 22 kpsi to 25 kpsi, or 27 kpsi, or 30 kpsi, or 35 kpsi, as measured in accordance with ASTM D638; and/or
v) a glass transition temperature from 80° C., or 90°, or 100° C. to 110° C., or 120° C., or 130° C.; and/or
vi) a melting temperature from 250° C., or 260° C., or 270°, or 280° C. to 290°, or 300° C., or 310° C., or 320° C., or 330° C., or 350° C.

In an embodiment, the thermoplastic or thermoset material has at least one, at least two, at least three, at least four, at least five, or all six of properties (i)-(vi).

As used herein, the term "attachment structures" refers to hardware components, assemblies and/or adhesive compounds which can be used to fixedly attach the seal body 110 to the main rotor 14. In the embodiment provided in FIG. 4, the one or more attachment structures 130 is a screw which passes through the seal body 110 and extending partially into the main rotor 14. However, in further embodiments, the one or more attachment structures may include, and is not limited to, screws, bolts, clips, adhesives, welds, and combinations of these and other structures or assemblies.

As further shown in FIG. 4, and in accordance with embodiments of the present disclosure, the seal body 110 is shown as attached to and partially set into the rotor 14. That is, in the embodiment shown, the seal body 110 itself makes up a portion of the rotor 14 near the edge of the rotor 14 nearest the suction end cavity 27. In further embodiments, the seal body 110 may be connected to a surface of the rotor 14 so as to extend away from the rotor 14 or, in further embodiments, set entirely into the rotor 14 (i.e., such that material of the rotor is in contact with both arcuate sides 112 and 116 of the seal body 110.

It will be appreciated that, because the seal body 110 is fixedly attached with the rotor 14, the high pressure seal assembly 100 will rotate with the rotor 14. Because the seal body 110 is made of a thermoplastic or thermoset material, the material will wear against the metal housing 12 if in contact with the housing. The clearance, or space, between the housing 12 and the seal body 110, and particularly the outer surface 118 of the seal body 110, can therefore be optimized. In particular, in an embodiment, the distance between the outer surface 118 of the seal body 110 and the inner surface of the housing 12 is from 0 µm, or greater than 0 µm, or 0.01 µm, or 0.05 µm, or 0.1 µm, or 0.5 µm, or 1.0 µm, or 5.0 µm to 10 µm, or 25 µm, or 50 µm, or 100 µm, or 250 µm, or 500 µm, or 1000 µm.

It is specifically intended that the present invention not be limited to the embodiments and illustrations contained herein, but include modified forms of those embodiments including portions of the embodiments and combinations of elements of different embodiments as come within the scope of the following claims.

We claim:

1. A seal assembly configured for use with a high pressure single screw compressor, the assembly comprising:
a seal body having a textured outer surface, the seal body being disposed around substantially an entirety of a circumference of a main rotor and located between a suction end cavity on a first side of the seal body and a discharge cavity on a second side of the seal body opposite the first side, the discharge cavity being bounded by the main rotor and a compressor housing and having a pressure resulting from the compression of gases by the high pressure single screw compressor, wherein a difference in pressure between the suction end cavity on the first side of the seal body and the discharge cavity on the second side of the seal body is greater than or equal to 600 psi, and wherein the seal body is made of a thermoplastic or thermoset material, and wherein an outer diameter of an outer surface of the seal body is greater than an outer diameter of an outer surface of the main rotor; and
at least one attachment structure which fixedly attaches the seal body to, so as to be rotatable along with, the main rotor of the high pressure single screw compressor,
wherein the textured outer surface creates a labyrinthine path between the suction end cavity and to the discharge cavity between the compressor housing and the main rotor.

2. The seal assembly of claim 1, wherein the seal body has a rectangular cross-section.

3. The seal assembly of claim 1, wherein the seal body is disc-shaped and is disposed entirely around the circumference of the main rotor.

4. The seal assembly of claim 1, wherein the seal body is made of a carbon fiber or glass fiber reinforced thermoplastic or thermoset material.

5. The seal assembly of claim 1, wherein the seal body is made of a thermoplastic material.

6. The seal assembly of claim 1, wherein the thermoplastic or thermoset material of the seal body is polyphenylene sulfide.

7. The seal assembly of claim 6, wherein the seal body further comprises carbon fiber or glass fiber in an amount of 20% to 60% of a total weight of the thermoplastic or thermoset material.

8. The seal assembly of claim 7, wherein the seal body comprises carbon fiber or glass fiber in an amount of 20% of a total weight of the thermoplastic or thermoset material.

9. The seal assembly of claim 1, wherein the textured outer surface comprises a plurality of spaced apart grooves.

10. The seal assembly of claim 1, wherein the seal body is at least partially set into the main rotor.

11. The seal assembly of claim 1, wherein the seal body is attached to and partially set into the main rotor such that the seal body makes up a portion of the main rotor at an edge of the main rotor nearest the suction end cavity.

12. A high pressure single screw compressor comprising:
a housing;
a main rotor that is secured within the housing and rotatably driven by a main rotor drive shaft about a main rotor drive shaft axis, and operably engaged with a plurality of gate rotors that are also secured within the housing;
a suction end cavity having a first pressure;
a discharge cavity having a second pressure, wherein the discharge cavity is bounded by the main rotor and the housing, the second pressure of the discharge cavity is a result of the compression of gases by the high pressure single screw compressor, and the first pressure is less than the second pressure; and
a seal assembly comprising
a seal body having a textured outer surface, the seal body being disposed around substantially an entirety of a circumference of a main rotor and located between the suction end cavity on a first side of the seal body and the discharge cavity on a second side of the seal body opposite the first side, wherein a difference in pressure between the suction end cavity on the first side of the seal body and the discharge cavity on the second side of the seal body is greater than or equal to 600 psi, and wherein the seal body is made of a thermoplastic or thermoset material, and wherein an outer diameter of an outer surface of the seal body is greater than a diameter of an outer surface of the main rotor, and
at least one attachment structure which fixedly attaches the seal body to, so as to be rotatable along with, the main rotor,
wherein the textured outer surface creates a labyrinthine path between the suction end cavity and the discharge cavity between the housing and the main rotor.

13. The high pressure single screw compressor of claim 12, wherein the seal body has a rectangular cross-section.

14. The high pressure single screw compressor of claim 12, wherein the seal body is disc-shaped and is disposed entirely around the circumference of the main rotor.

15. The high pressure single screw compressor of claim 12, wherein the seal body is made of a thermoplastic or thermoset material.

16. The high pressure single screw compressor of claim 12, wherein the seal body is made of a carbon fiber or glass fiber reinforced thermoplastic or thermoset material.

17. The high pressure single screw compressor of claim 12, wherein the seal body is made of a thermoplastic material.

18. The high pressure single screw compressor of claim 12, wherein the thermoplastic or thermoset material of the seal body is polyphenylene sulfide.

19. The seal assembly of claim 18, wherein the seal body further comprises carbon fiber or glass fiber in an amount of 20% to 60% of a total weight of the thermoplastic or thermoset material.

20. The high pressure single screw compressor of claim 12, wherein the textured outer surface comprises a plurality of spaced apart grooves.

* * * * *